(12) United States Patent
Magee et al.

(10) Patent No.: US 10,619,519 B2
(45) Date of Patent: Apr. 14, 2020

(54) BYPASS CONDUITS FOR REDUCING THERMAL FATIGUE AND STRESS IN HEAT RECOVERY STEAM GENERATORS OF COMBINED CYCLE POWER PLANT SYSTEMS

(71) Applicant: General Electric Company, Schenectady, NY (US)

(72) Inventors: Jeffrey Frederick Magee, Longmeadow, MA (US); Denis Robert Bruno, Granby, MA (US); Van Dang, Bloomfield, CT (US); Dimitrios Vasilios Doupis, Avon, CT (US); Scott William Herman, Enfield, CT (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 15/833,188

(22) Filed: Dec. 6, 2017

(65) Prior Publication Data

US 2019/0170021 A1      Jun. 6, 2019

(51) Int. Cl.
| | |
|---|---|
| *F01K 13/02* | (2006.01) |
| *F01K 13/00* | (2006.01) |
| *F01K 23/10* | (2006.01) |

(52) U.S. Cl.
CPC ............ *F01K 13/02* (2013.01); *F01K 13/003* (2013.01); *F01K 23/10* (2013.01)

(58) Field of Classification Search
CPC ......... F01K 13/02; F01K 13/003; F01K 23/10
See application file for complete search history.

(56) References Cited

U.S. PATENT DOCUMENTS 2,653,447 A * 9/1953 Heller .................. F01K 23/103
                                                                  60/655
5,628,179 A   5/1997 Tomlinson
(Continued)

FOREIGN PATENT DOCUMENTS

JP            02308907 A  * 12/1990  ............. F01K 23/10

OTHER PUBLICATIONS

JP 02308907 A English Translation (Year: 1990).*

*Primary Examiner* — Mark A Laurenzi
*Assistant Examiner* — Shafiq Mian
(74) *Attorney, Agent, or Firm* — Dale Davis; Hoffman Warnick LLC

(57) ABSTRACT

Heat recovery steam generators (HRSGs) including bypass conduits for reducing fatigue and/or stress experienced by components within the HRSGs are disclosed. The HRSG may include a steam generator module generating steam, and a first superheater module positioned downstream of the steam generator module. The first superheater module may receive the steam generated by the steam generator module. The HRSG may also include a second superheater module positioned downstream from the first superheater module, and a bypass conduit for receiving a portion of the steam generated by the steam generator module. The bypass conduit may include an inlet positioned downstream of the steam generator module, and an outlet positioned downstream of the first superheater module. Additionally, the HRSG may include a valve in fluid communication with the bypass conduit to provide steam to the outlet of the bypass conduit.

16 Claims, 13 Drawing Sheets

(56) References Cited

U.S. PATENT DOCUMENTS

| | | | | |
|---|---|---|---|---|
| 6,338,241 | B1* | 1/2002 | Shibuya | F01K 23/106 60/39.182 |
| 6,393,822 | B2* | 5/2002 | Nagashima | F01K 23/106 60/783 |
| 6,397,575 | B2* | 6/2002 | Tomlinson | F01K 23/106 60/39.182 |
| 6,957,630 | B1* | 10/2005 | Mastronarde | F22B 1/1815 122/406.4 |
| 7,168,233 | B1* | 1/2007 | Smith | F01K 23/106 60/39.182 |
| 8,327,615 | B2* | 12/2012 | Kitaguchi | F01K 13/02 60/39.182 |
| 8,726,625 | B2* | 5/2014 | Holt | F01K 23/10 122/460 |
| 9,739,478 | B2* | 8/2017 | Rancruel | F22G 3/00 |
| 9,921,001 | B2* | 3/2018 | Jackson | F22B 21/18 |
| 2001/0023577 | A1* | 9/2001 | Nagashima | F01K 23/106 60/772 |
| 2011/0247335 | A1* | 10/2011 | Schmid | F01K 23/10 60/676 |
| 2014/0096535 | A1* | 4/2014 | Esakki | F01K 13/02 60/783 |
| 2019/0072006 | A1* | 3/2019 | Duffy | F01K 13/02 60/776 |

* cited by examiner

BYPASS CONDUITS FOR REDUCING THERMAL FATIGUE AND STRESS IN HEAT RECOVERY STEAM GENERATORS OF COMBINED CYCLE POWER PLANT SYSTEMS

BACKGROUND OF THE INVENTION

The disclosure relates generally to combined cycle power plant system, and more particularly, to bypass conduits for reducing fatigue and stress experienced by components within a heat recovery steam generator (HRSG) of the combined cycle power plant system.

Power systems typically include a variety of different turbomachines and/or systems that are used to generate operational load and/or power output. Two conventional power systems used to generate operational loads include gas turbine systems and combined cycle power plants, which typically include a gas turbine system(s). Conventional combined cycle power plants employ one or multiple gas turbine system(s) operatively coupled to one or multiple steam turbine system(s). The gas turbine system includes a compressor coupled to a gas turbine. The gas turbine is usually coupled to and drives an external component, such as a generator, for producing a load or power output. The steam turbine system includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG the exhaust gas is released to the atmosphere through a stack.

However, during operation of the power system, portions and/or components may experience high stress and thermal fatigue due to rapid temperature change of the components. For example, when the power system undergoes a start-up procedure, the HRSG may immediately begin to generate high temperature steam. This high temperature steam may be provided, supplied and/or moved through portions and/or various components (e.g., boiler modules) of the HRSG, and then to outlet components (e.g., steam headers, steam outlet manifold) of the HRSG which may be at reduced or pre-start temperature (e.g., room temperature) that are significantly lower than the temperature of the high temperature steam. As a result of the exposure to the high temperature steam, the portions and/or components of the HRSG may undergo a rapid temperature change. The rapid temperature change may increase the high stress and/or thermal fatigue experienced by the components exposed to the high temperature steam during the start-up procedure. Once the power system is operational for a predetermined amount of time, the steam-exposed components of the HRSG may be consistently heated to an operational temperature, which in turn may reduce the stress and thermal fatigue experienced by the components.

Additionally, when the power plant is shut down again (e.g., not operational), the temperature of the components of the HRSG may again decrease to the pre-start temperature, and upon the next start-up procedure, may experience the same high stress and/or thermal fatigue. In cases of continued exposure to high stress and/or thermal fatigue, components of the HRSG may degrade and/or become damaged, which may reduce operational performance of the power system. Additionally, any damaged components may eventually need to be replaced, which requires the power system to be completely shut down while the damaged components are replaced. The necessity to replace the damaged parts within the power system may reduce the operational time of the power system, which reduces the overall power or load output, and also increases the maintenance costs (e.g., component replacement) for the power system over the operational life of the system.

BRIEF DESCRIPTION OF THE INVENTION

A first aspect of the disclosure provides a heat recover steam generator (HRSG) for a combined cycle power plant system. The HRSG includes: a steam generator module generating steam; a first superheater module positioned downstream of the steam generator module, the first superheater module receiving the steam generated by the steam generator module; a second superheater module positioned downstream from the first superheater module; a bypass conduit for receiving a portion of the steam generated by the steam generator module, the bypass conduit including: an inlet positioned downstream of the steam generator module, and an outlet positioned downstream of the first superheater module; and a valve in fluid communication with the bypass conduit, the valve providing steam to the outlet of the bypass conduit.

A second aspect of the disclosure provides a combined cycle power plant system including: a gas turbine system including a turbine component discharging an exhaust gas; and a heat recovery steam generator (HRSG) in fluid communication with the turbine component for receiving the exhaust gas, the HRSG including: a steam generator module generating steam; a first superheater module positioned downstream of the steam generator module, the first superheater module receiving the steam generated by the steam generator module; a second superheater module positioned downstream from the first superheater module; a bypass conduit for receiving a portion of the steam generated by the steam generator module, the bypass conduit including: an inlet positioned downstream of the steam generator module; and an outlet positioned downstream of the first superheater module; and a valve in fluid communication with the bypass conduit, the valve providing steam to the outlet of the bypass conduit.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
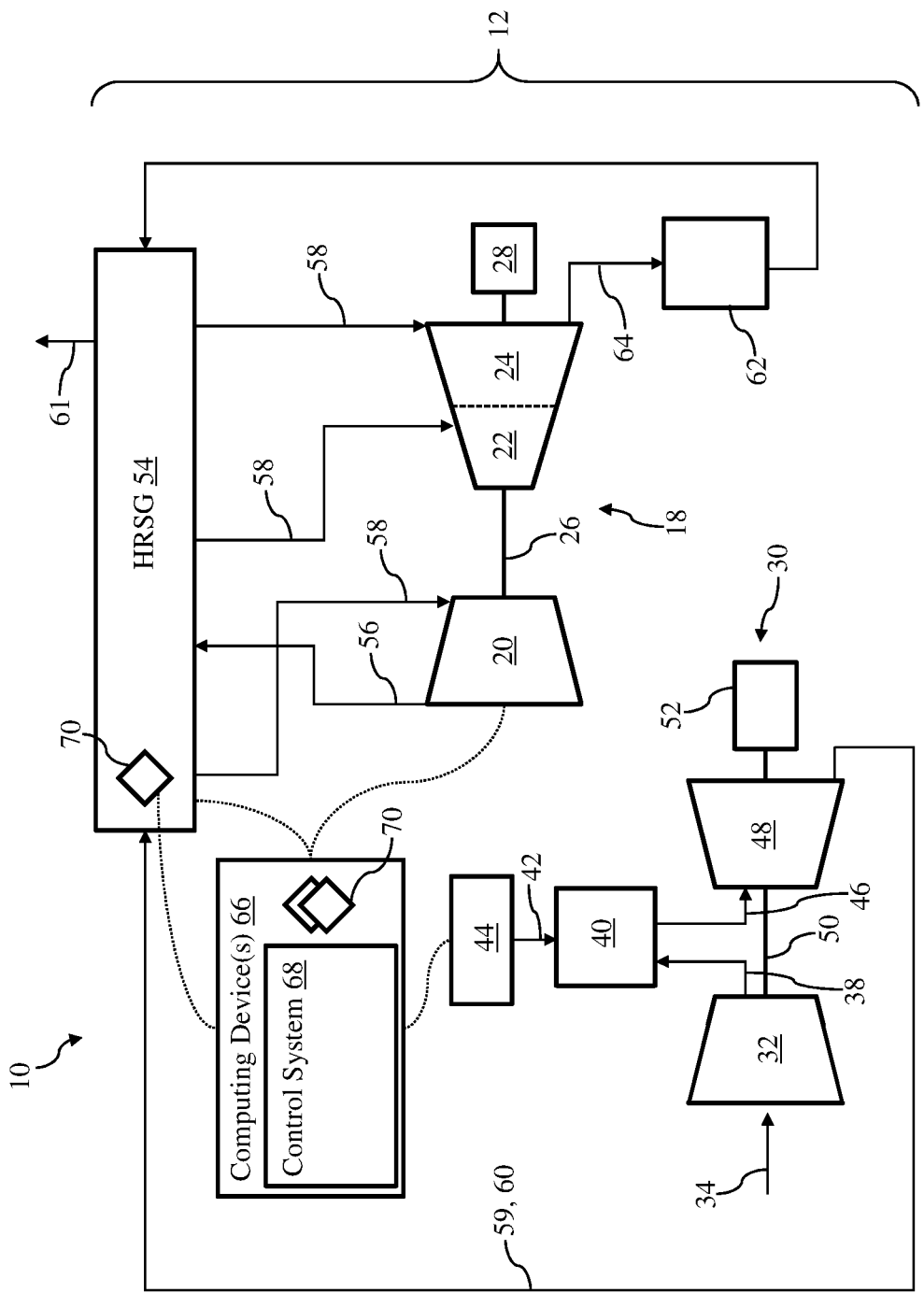
FIG. 1 shows a schematic depiction of a combined cycle power plant system including a gas turbine system, a steam turbine system and a control system, according to embodiments of the disclosure.
Figure 8:
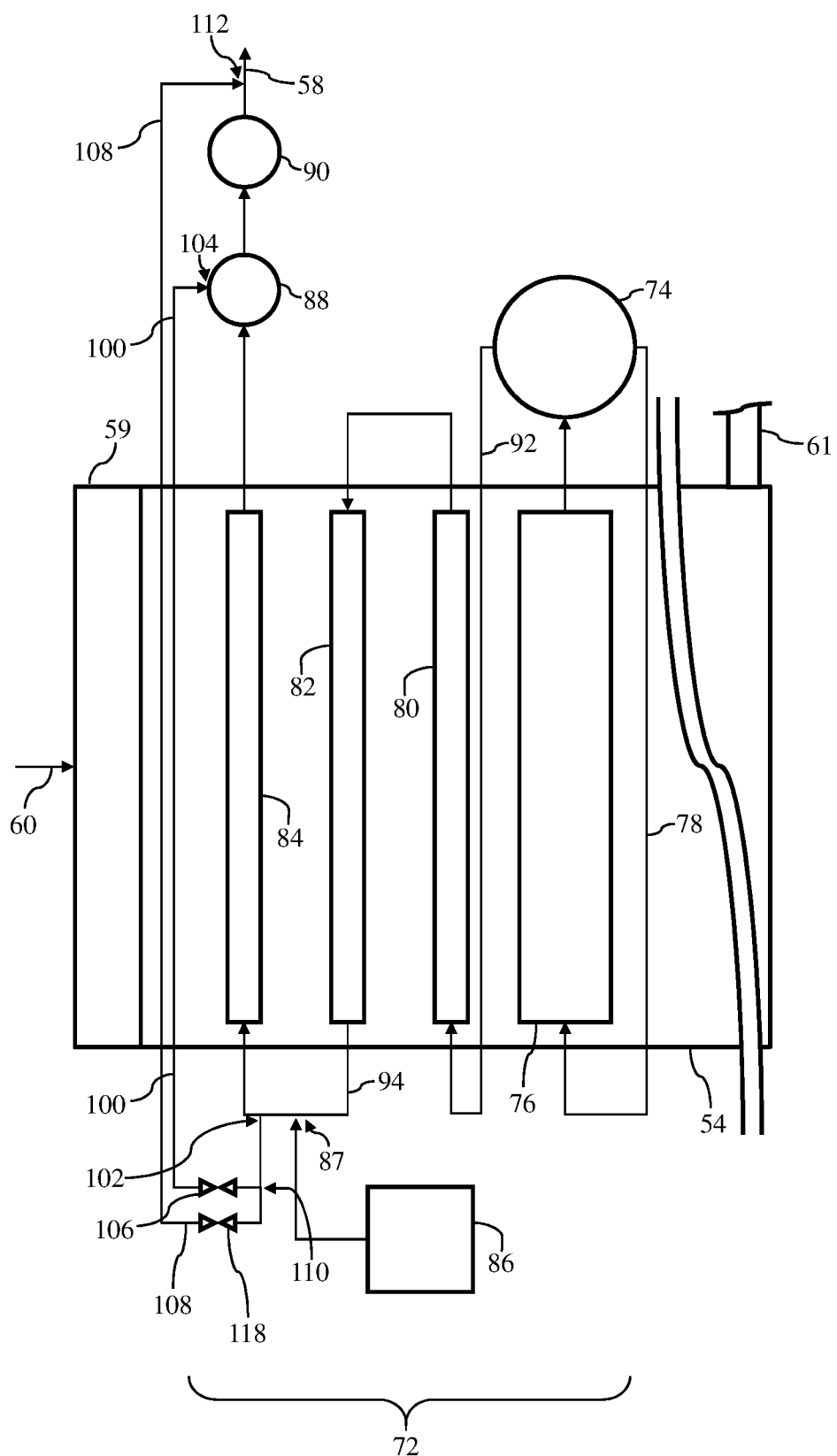

FIG. 8 shows a schematic depiction of a portion of the HRSG of the combined cycle power plant system of FIG. 1 including two distinct bypass conduits, according to embodiments of the disclosure.

Figure 9:
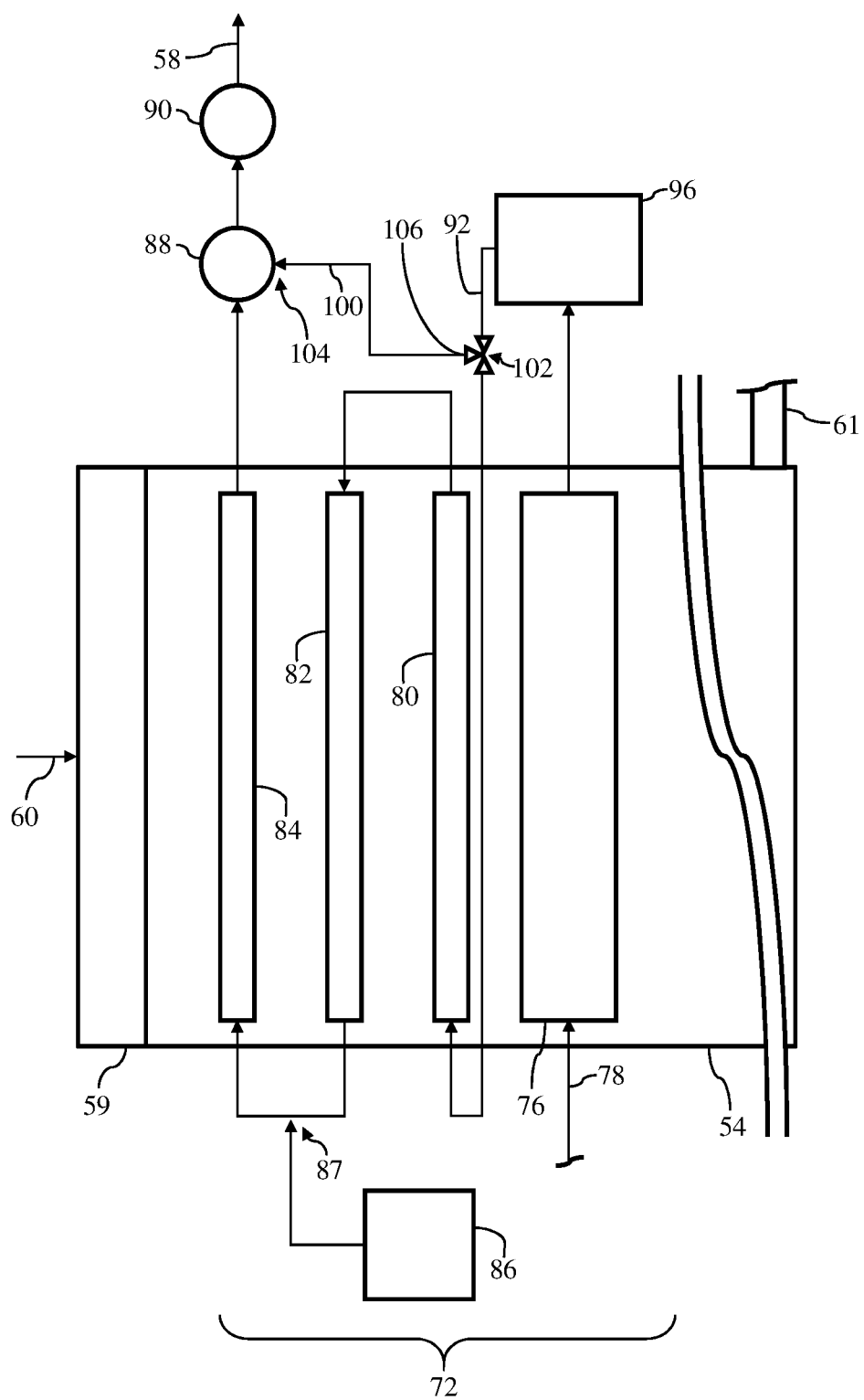
Figure 10:
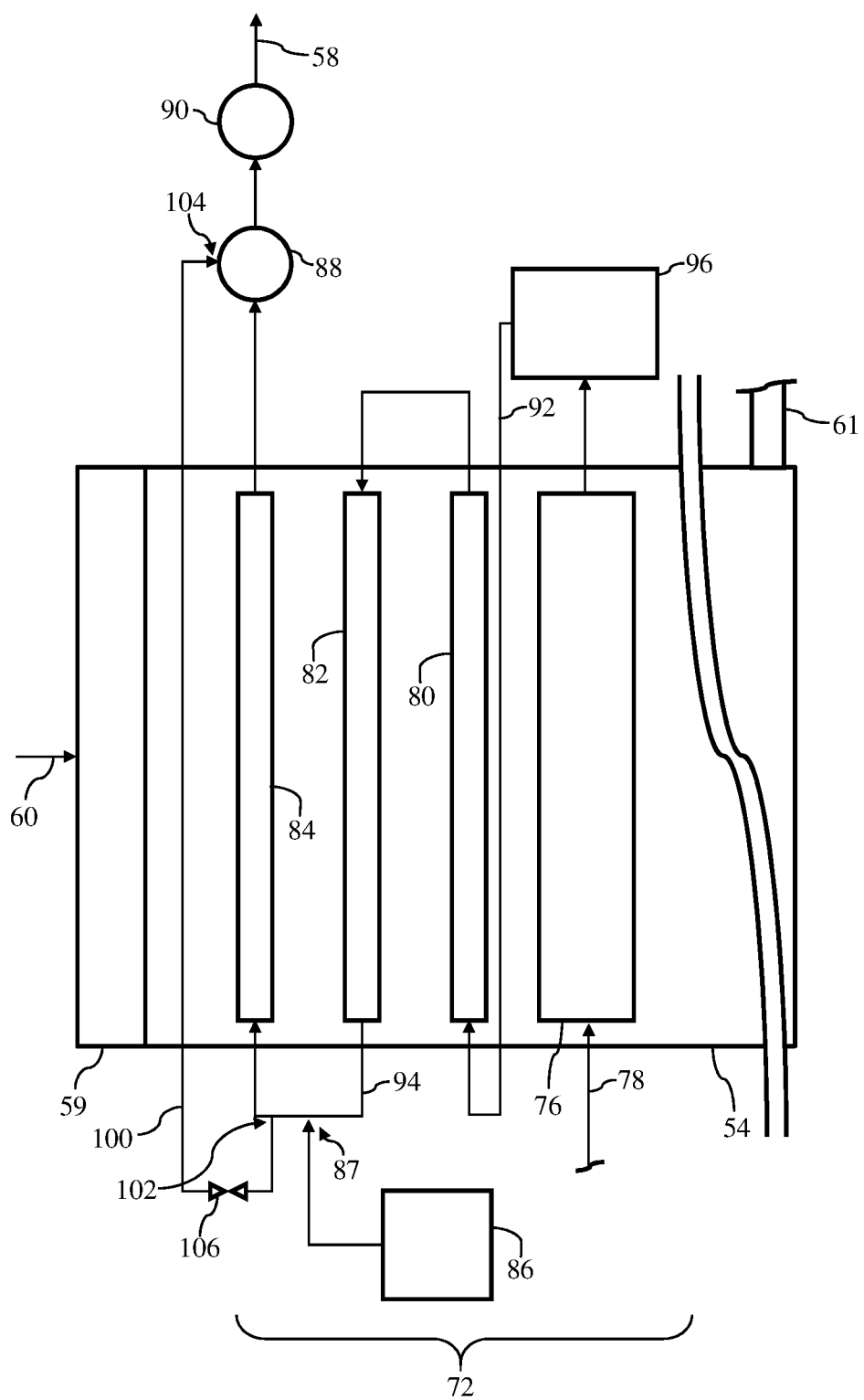

FIGS. 9 and 10 show schematic depiction of a portion of an HRSG of the combined cycle power plant system of FIG. 1 including bypass conduits, according to additional embodiments of the disclosure.

Figure 11:
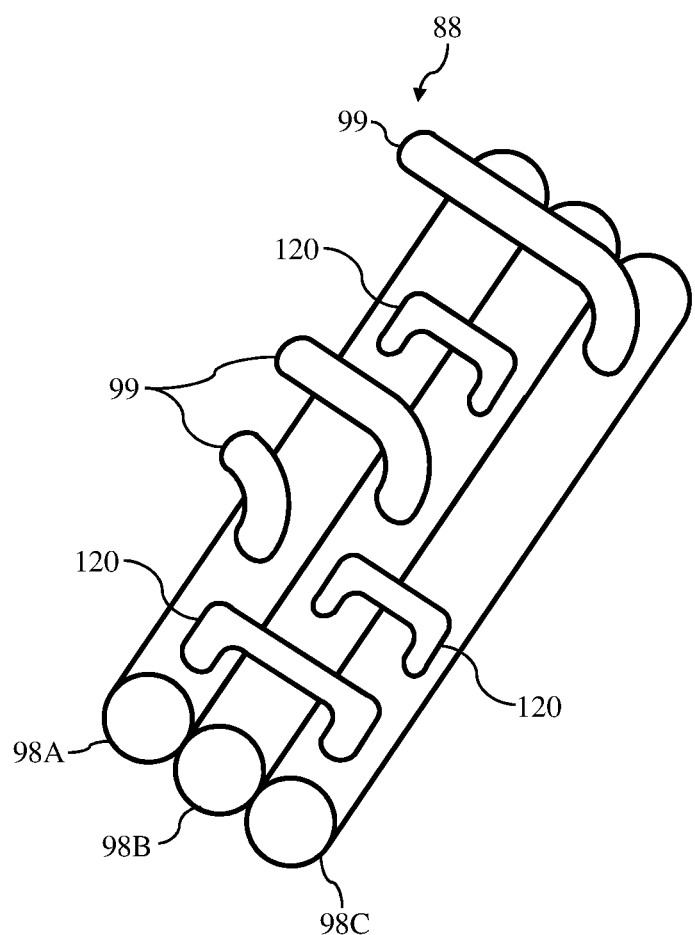

FIG. 11 shows a perspective view of a portion of a header of the HRSG of the combined cycle power plant system of FIG. 1 including a plurality of header conduits and a plurality of distribution links in communication with the plurality of header conduits, according to embodiments of the disclosure.

Figure 12:
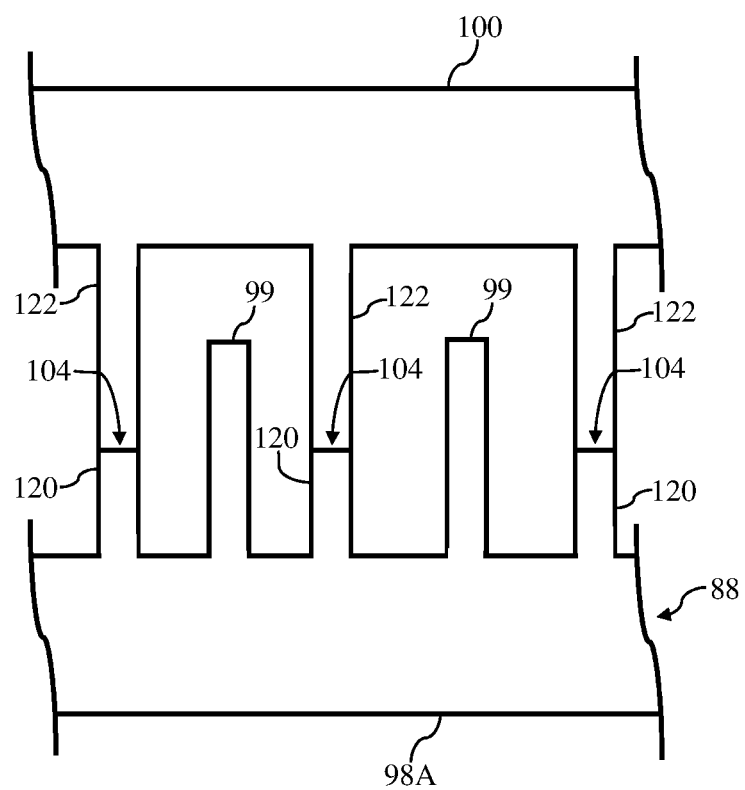

FIG. 12 shows a side view of a portion of a bypass conduit and a portion of one of the plurality of head conduits of FIG. 11 including distribution links, according to embodiments of the disclosure.

Figure 13:
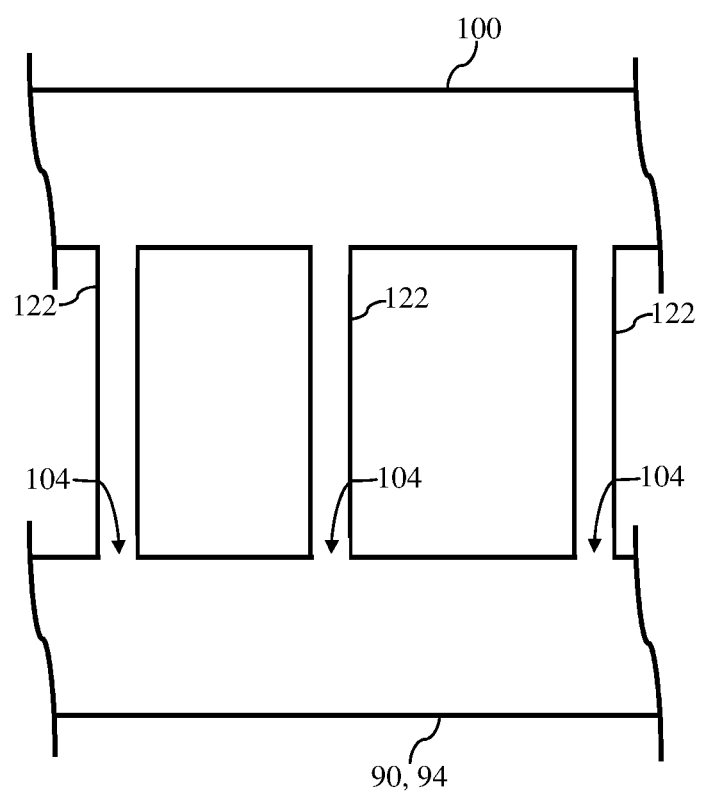

FIG. 13 shows a side view of a portion of a bypass conduit in fluid communication with a distinct conduit of the HRSG of the combined cycle power plant system of FIG. 1, according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a combined cycle power plant system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to combined cycle power plant system, and more particularly, to bypass conduits for reducing fatigue and stress experienced by components within a heat recovery steam generator (HRSG) of the combined cycle power plant system.

These and other embodiments are discussed below with reference to FIGS. 1-13. However, those skilled in the art will readily appreciate that the detailed description given herein with respect to these Figures is for explanatory purposes only and should not be construed as limiting.

FIG. 1 shows a schematic depiction of a system 10 according to various embodiments of the disclosure. As shown, system 10 can include a combined cycle power plant system 12 (hereafter, "power plant system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, and more specifically, a generator 28 configured to generate power and/or produce a load.

Power plant system 12 can further include a gas turbine (GT) system 30. GT system 30 may include a compressor 32. Compressor 32 compresses an incoming flow of fluid 34 (e.g., air) as it flows through compressor 32. GT system 30 may also include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although power plant system 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although power plant system 12 is shown to only include a single ST system 18 and single GT system 30, it is understood that power plant system 12 may include a plurality of ST systems 18 and/or GT system(s) 30 that may be configured to generate an operational load and/or power output.

Power plant system 12 can further include a heat recovery steam generator (HRSG) 54 fluidly connected with the ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, as well as, provide steam to the portions of ST system 18 via supply conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power plant system 12.

Power plant system 12 can further include a condenser 62. Condenser 62 may be in fluid communication and/or may be fluidly coupled with various components of power plant system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54, and providing condensed fluid (e.g., condensate water) to HRSG 54, as is known in the art.

As shown in FIG. 1, system 10 can include at least one computing device 66 configured to control power plant system 12. Computing device(s) 66 can be hard-wired and/or wirelessly connected to and/or in communication with power plant system 12, and its various components (e.g., ST system 18, GT system 30, HRSG 54 and so on) via any suitable electronic and/or mechanical communication component or technique. Computing device(s) 66, and its various components discussed herein, may be a single stand-alone system that functions separate from another power plant control system (e.g., computing device) (not shown) that may control and/or adjust operations and/or functions of power plant system 12, and its various components (e.g., ST system 18, GT system 30 and so on). Alternatively, computing device(s) 66 and its components may be integrally formed within, in communication with and/or formed as a part of a larger power plant control system (e.g., computing device) (not shown) that may control and/or adjust operations and/or functions of power plant system 12, and its various components (e.g., ST system 18, GT system 30 and so on).

In various embodiments, computing device(s) 66 can include a control system 68 and one or more sensors 70, as described herein, for controlling operations of power plant system 12. As discussed herein control system 68 can control power plant system 12, and its various components, to optimize performance of power plant system 12, and/or increase the operational life of the components of power plant system 12. For example, and as discussed herein, control system 68 may utilize data and/or operational characteristics of HRSG 54, and the components included therein, determined by sensor(s) 70 to control the operation of components included within the HRSG 54 to ultimately improve or optimize performance of HRSG 54, and/or increase the operational life of components of HRSG 54.

As shown in FIG. 1, computing device(s) 66 may include and/or may be in electrical and/or mechanical communication with sensor(s) 70 positioned throughout system 10. As shown in the non-limiting example of FIG. 1, and discussed herein, at least one sensor 70 of and/or connected to computing device(s) 66 may be positioned within HRSG 54 (see also, e.g., FIG. 2). Sensor(s) 70 in communication with computing device(s) 66 of system 10 may be any suitable sensor or device configured to detect and/or determine data, information, and/or operational characteristics relating to power plant system 12 during operation. For example, and as discussed herein, sensor(s) 70 positioned within HRSG 54 of power plant system 12 may be any suitable sensor configured to detect and/or determine a working fluid (e.g., steam, exhaust fluid 60) temperature within portions and/or components of HRSG 54, temperatures of component(s) of HRSG 54 of power plant system 12, and/or steam flow measurements of steam flowing through HRSG 54. In non-limiting examples, sensor(s) 70 may be configured as, but not limited to, thermometers, thermistor, thermocouples, and/or any other mechanical/electrical temperature sensor.

Although two sensor 70 are shown, it is understood that system 10 may include more sensor(s) 70 (see, e.g., FIG. 2) that may be configured to provide computing device(s) 66, and specifically control system 68, with information or data relating to the temperature of the fluids and components included within HRSG 54, and/or steam flow measurements. The number of sensors 70 shown in FIG. 1 is merely illustrative and non-limiting. As such, system 10 may include more or less sensors 70 than what is depicted in the Figures.

Figure 2:
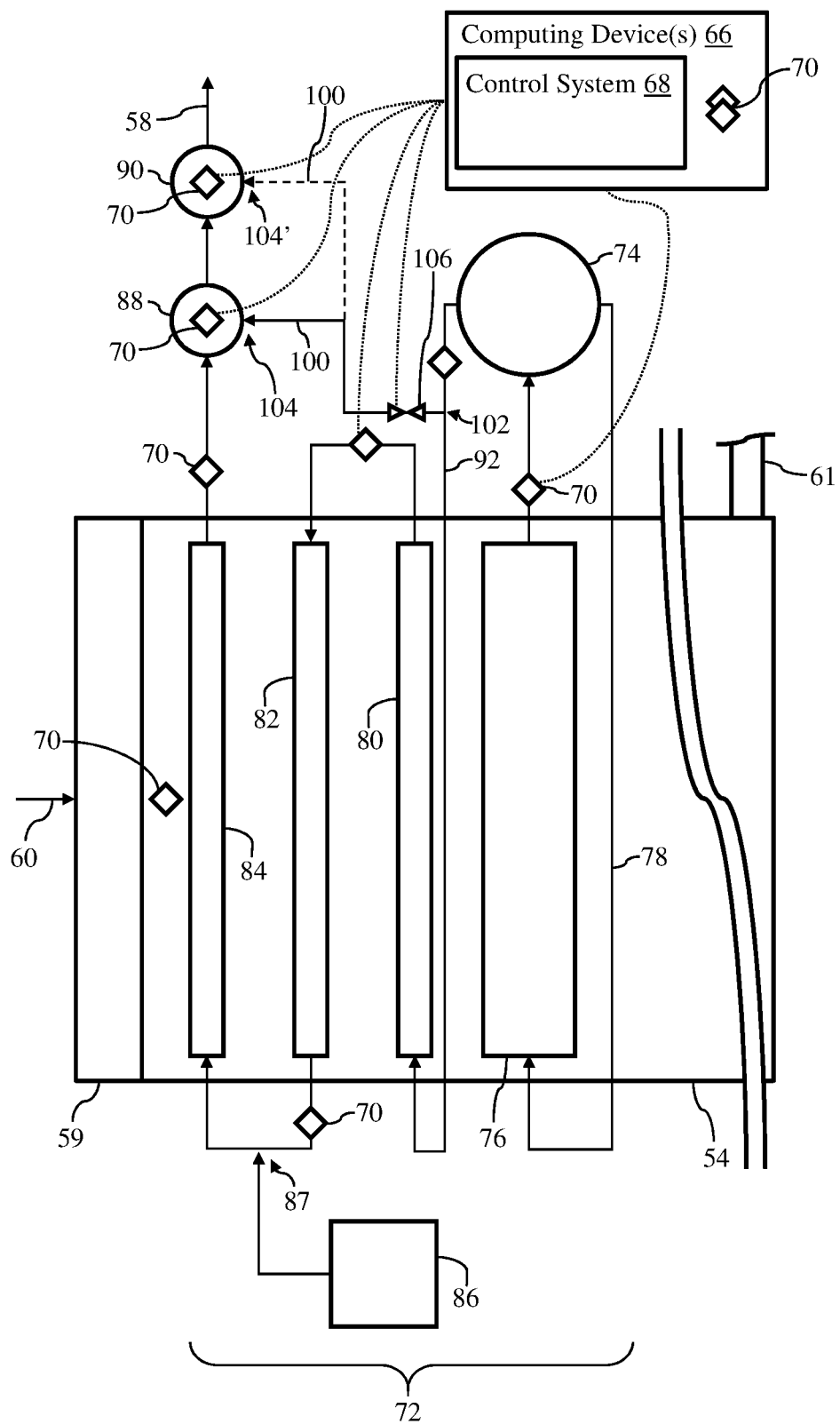
FIG. 2 shows a schematic depiction of a portion of a heat recovery steam generator (HRSG) of the combined cycle power plant system of FIG. 1 including a bypass conduit, according to embodiments of the disclosure.

FIG. 2 shows a schematic view of a portion of HRSG 54 of power plant system 12 shown in FIG. 1. Specifically, FIG. 2 shows a schematic view of a portion of HRSG 54 and a portion of the components and/or systems (e.g., boiler modules) included therein for generating and/or providing steam to the portions of ST system 18 (see, FIG. 1) via supply conduits 58, as discussed herein. It is understood that similarly numbered and/or named components may function in a substantially similar fashion. Redundant explanation of these components has been omitted for clarity.

As shown in FIG. 2, and as discussed herein with respect to FIG. 1, exhaust channel 59 may provide exhaust fluid 60 (e.g., gas) from GT system 30 (see, FIG. 1) to HRSG 54. Exhaust fluid 60 may flow through HRSG 54, and/or over a plurality of components (e.g., boiler modules) of HRSG 54, discussed herein, to generate and/or heat steam that may be provided to ST system 18 via supply conduits 58. Once exhaust fluid 60 pass through HRSG 54, exhaust fluid 60 may exhaust or release from HRSG 54 into the atmosphere and/or out of power plant system 12 via stack 61 of HRSG 54.

HRSG 54 may include a plurality of components, systems and/or boiler modules that may utilize the heat of exhaust fluid 60 to generate and/or heat steam for ST system 18. For example, HRSG 54 may include a plurality of boiler module 72 extending through and/or positioned within each HRSG 54. Each of the plurality of boiler modules 72 (one shown) of HRSG 54 may generate steam for and/or correspond to each of the plurality of portions of ST system 18 (e.g., HP portion 20, IP portion 22, and so on). In the non-limiting example shown in FIG. 2, boiler module 72 shown may correspond to and/or generate steam for HP portion 20 of ST system 18. Although only a single boiler module 72 is shown, it is understood that HRSG 54 may also include a plurality of boiler modules generating, receiving, and/or supplying steam for ST system 18.

Boiler module 72 of HRSG 54, and various components, may be in fluid communication with a respective steam drum 74 of HRSG 54 for receiving, generating and/or providing steam. That is, HRSG 54 may include a steam drum 74 that may provide feed water to boiler module 72 and may receive steam generated by boiler module 72. As shown in the non-limiting example of FIG. 2, boiler module 72 may include a steam generator module 76 in fluid communication with steam drum 74, and vice versa. That is, a feed water conduit 78 may be in fluid communication with steam drum 74 and steam generator module 76 of boiler module 72, and may provide feed water to steam generator module 76. Steam generator module 76 may in turn move the feed water through HRSG 54 to allow exhaust fluid 60 flowing through HRSG 54 to convert the feed water to steam within steam generator module 76. Steam generator module 76 may then provide the saturated steam to steam drum 74.

The steam generated by steam generator module 76 may then be provided to a plurality of superheater modules of boiler module 72 of HRSG 54. In the non-limiting example shown in FIG. 2, boiler module 72 may include a first superheater module 80, a second superheater module 82, and a third superheater module 84. Each of the plurality of superheater modules 80, 82, 84 of boiler module 72 of HRSG 54 may heat the steam generated and/or provided by steam generator module 76 to a desired temperature before ultimately being provided to HP portion 20 of ST system 18, as discussed herein. That is, and as similarly discussed herein with respect to steam generator module 76, each of the plurality of superheater modules 80, 82, 84 may move steam through HRSG 54 and may utilize exhaust fluid 60 flowing through HRSG 54 to heat the steam flowing therein. Additionally, although three superheater modules 80, 82, 84 are shown, it is understood that boiler module 72 and/or HRSG 54 may also include more or less superheater modules, and the number shown is understood as merely illustrative.

First superheater module 80 may be positioned downstream of steam generator module 76. Specifically, first superheater module 80 may be positioned downstream of and may be in fluid communication with steam drum 74. As such, steam drum 74 may provide, and/or first superheater module 80 may receive the steam generated by steam generator module 76 from steam drum 74. Second superheater module 82 and third superheater module 84 may be positioned downstream of first superheater module 80. More specifically, second superheater module 82 may be positioned downstream of first superheater module 80, and third superheater module 84 may be positioned downstream of first superheater module 80 and second superheater module 82, respectively. Additionally, second superheater module 82 may be positioned upstream of third superheater module 84. Additionally, and as shown in the non-limiting example of FIG. 2, the plurality of superheaters modules 80, 82, 84 may be in fluid communication with one another and may move the steam through each of the plurality of superheater modules 80, 82, 84, as discussed herein. That is, second superheater module 82 may be in fluid communication with first superheater module 80, and may receive steam from first superheater module 80. Furthermore, third superheater module 84 may be in fluid communication with second superheater module 82, and may receive steam from second superheater module 82. Each of the plurality of superheater modules 80, 82, 84 may be in fluid communication with one another, and other components of HRSG 54, via fluid conduits depicted herein as arrows. The direction of the arrows may also identify the flow direction of the steam through boiler module 72 and/or HRSG 54, as discussed herein.

HRSG 54 of power plant system 12 may also include a desuperheater module 86. As shown in the non-limiting example of FIG. 2, desuperheater module 86 may be positioned between second superheater module 82 and third superheater module 84. Specifically, desuperheater module 86 may include an inlet 87 positioned between and/or directly on the conduit fluidly coupling second superheater module 82 and third superheater module 84. Desuperheater module 86 may be included within boiler module 72 to control and/or alter the temperature of the steam flowing through the plurality of superheater modules 80, 82, 84 of HRSG 54. For example, desuperheater module 86 may provide cooling fluid (e.g., cold air, water spray, and so on) to the steam flowing from second superheater module 82, and prior to the steam entering third superheater 84. As such, desuperheater module 86 may provide cool air, and/or cool water spray within boiler module 72 of HRSG 54 to ensure that the steam moving through the plurality of superheater modules 80, 82, 84 does not exceed a desired temperature within HRSG 54.

Additionally, HRSG 54 may also include a steam header 88 (hereafter, "header 88") and a steam outlet manifold 90 (hereafter, "outlet manifold 90"), respectively. As shown in FIG. 2, header 88 may be positioned downstream of and may be in fluid communication with third superheater module 84 of boiler module 72. Additionally, outlet manifold 90 may be positioned downstream of and may be in fluid communication with header 88. Outlet manifold 90 may also be in fluid communication with supply conduit 58 for HP portion 20 of ST system 18 (see, FIG. 1), as discussed herein. During operation of HRSG 54, third superheater module 84 in fluid communication with header 88 may provide heated steam to header 88. The heated steam provided to header 88 may have previously passed through each of the plurality of superheater modules 80, 82, 84, and may be heated to a high-temperature equal to the operational parameters and/or temperature requirements of HP portion 20 of ST system 18. This heated, high-temperature steam may then be provide the heated steam to outlet manifold 90, which may subsequently move the heated, high-temperature steam to HP portion 20 of ST system 18 via supply conduit 58 (see, FIG. 1).

Although depicted or represented as a block herein, it is understood that steam generator module 76 and/or each of the plurality superheater modules 80, 82, 84 may include a plurality of components. For example, steam generator module 76 and/or each of the plurality superheater modules 80, 82, 84 may include a plurality of tubes positioned between and/or in fluid communication with two distinct manifolds formed on each end of the plurality of tubes. The plurality of the tubes may carry the working fluid (e.g., feed water, steam) and may be exposed to the exhaust fluid 60 to generate and/or heat the steam flowing therein. Additionally, the manifolds coupled to the plurality of tubes may be in fluid communication with the conduits that fluidly couple steam generator module 76 and/or each of the plurality superheater modules 80, 82, 84. Additionally, although shown as single components, it is understood that header 88 and/or outlet manifold 90 may include a plurality of distinct, interconnected components (e.g., conduits) (see, FIG. 11; header 88).

Additionally as shown in FIG. 2, HRSG 54 may also include a bypass conduit 100. Bypass conduit 100 may receive a portion of the steam generated by steam generator module 76 and may provide it to a component (e.g., header 88, outlet manifold 90) of boiler module 72 and/or HRSG 54 downstream of steam generator module 76 to aid in reducing the thermal fatigue and/or stress experienced by the component, as discussed herein. Bypass conduit 100 may include an inlet 102, and an outlet 104 positioned opposite the inlet 102 on bypass conduit 100. Inlet 102 of bypass conduit 100 may be positioned downstream of steam generator module 76. In a non-limiting example shown in FIG. 2, inlet 102 of bypass conduit 100 may be positioned between steam drum 74 and/or steam generator module 76, and first super heater module 80. Specifically in the non-limiting example, inlet 102 may be formed on, positioned within, and/or may be in fluid communication with the conduit 92 disposed between and fluidly coupling steam drum 74 to first superheater module 80. As such, bypass conduit 100 may be provided with the steam generated by steam generator module 76, provided to steam drum 74, and subsequently provided to first superheater module 80, via conduit 92.

Additionally, outlet 104 of bypass conduit 100 may be positioned downstream of first super heater module 80. As shown in the non-limiting example of FIG. 2, outlet 104 of bypass conduit 100 may be formed in, positioned on, and/or in direct fluid communication with header 88 of HRSG 54. As such, bypass conduit 100 may be in fluid communication with conduit 92 and header 88, respectively, and may provide a portion of steam flowing through conduit 92 to header 88 of HRSG 54 via outlet 104. In another non-limiting example shown in FIG. 2, outlet 104' of bypass conduit 100 may be formed in, positioned on, and/or in direct fluid communication with outlet manifold 90 of HRSG 54 (see, bypass conduit 100, phantom section). In this non-limiting example, bypass conduit 100 may be in fluid communication with conduit 92 and outlet manifold 90, respectively, and may provide a portion of steam flowing through conduit 92 to outlet manifold 90 of HRSG 54 via outlet 104'. In an additional non-limiting example shown in FIG. 2, bypass conduit 100 may include two distinct outlets 104, 104'; a first outlet 104 formed in, positioned on, and/or in direct fluid communication with header 88 of HRSG 54, and a second outlet 104' formed in, positioned on, and/or in direct fluid communication with outlet manifold 90 of HRSG 54. In this non-limiting example, bypass conduit 100 may provide a portion of steam flowing through conduit 92 to both header 88 and outlet manifold 90 of HRSG 54 via the distinct outlets 104, 104'.

Additionally, as shown in FIG. 2, HRSG 54 may include a valve 106 in fluid communication with bypass conduit 100. In the non-limiting example shown in FIG. 2, valve 106 may be positioned on and/or formed directly on bypass conduit 100, between inlet 102 and outlet 104, respectively. In other non-limiting examples (see, FIG. 3), valve 106 may be positioned at and/or in direct fluid communication with outlet 104 of bypass conduit 100. Valve 106 may be in fluid communication with bypass conduit 100 to provide steam to and/or allow steam to flow through bypass conduit 100. That is, valve 106 in fluid communication with bypass conduit 100 to provide steam to outlet 104 of bypass conduit 100, and the respective portion or HRSG 54 in fluid communication with outlet 104 of bypass conduit 100. In the non-limiting example in FIG. 2, valve 106 may be adjusted between an open position and a closed position to provide steam to outlet 104 of bypass conduit 100, and subsequently header 88 and/or outlet manifold 90. Valve 106 may be any suitable valve, mechanism, device, and/or component capable of regulating and/or controlling the flow of steam through bypass conduit 100. For example, valve 106 may be configured as any suitable hydraulic valve, pneumatic valve, manual valve, solenoid valve, or motorized valve.

As shown in FIG. 2, and similarly discussed herein with respect to FIG. 1, computing device(s) 66, and more specifically, control system 68 of computing device(s) 66, may be operably coupled to and/or in electronic communication with various components of HRSG 54. For example, computing device(s) 66, and more specifically, control system 68 of computing device(s) 66, may be operably coupled to and/or in electronic communication with valve 106 of HRSG 54. Control system 68 of computing device(s) 66 may be configured to activate and/or control the operation of valve 106. Control system 68 may activate and/or control operation (e.g., open position, closed position, partially-open position) of valve 106 to aid in the reduction of the thermal fatigue and/or stress experienced by components of HRSG 54 (e.g., header 88, outlet manifold 90) during operation of power plant system 12, as discussed herein.

To help in the activation and/or control of valve 106, control system 68 may also utilize information obtained by sensor(s) 70 positioned with HRSG 54. As discussed herein with respect to FIG. 1, HRSG 54 may include sensor(s) 70 of computing device(s) 66 positioned therein. In the non-limiting example shown in FIG. 2, sensor(s) 70 may be positioned within various portions of HRSG 54 for obtaining a variety of information and/or operational characteristics for components of HRSG 54. For example, sensors 70 may be positioned on a conduit between steam generator module 76 and steam drum 74, on conduit 92 between steam drum 74 and first superheater module 80, on a conduit between first superheater module 80 and second superheater module 82, a conduit between second superheater module 82 and third superheater module 84, and a conduit between third superheater module 84 and header 88. Additionally, and as shown in the non-limiting example of FIG. 2, sensors 70 may be positioned within header 88 and outlet manifold 90, respectively. Furthermore, sensors 70 may be positioned within the housing of HRSG 54 adjacent to superheater modules 80, 82, 84. Specifically, and as shown in the non-limiting example of FIG. 2, sensor 70 may be positioned within HRSG 54, adjacent third superheater module 84, and adjacent to and/or downstream of exhaust channel 59.

As discussed herein, sensors 70 positioned within HRSG 54 may be configured to detect and/or determine a fluid temperature, temperatures of components and/or steam flow. In the non-limiting examples shown in FIG. 2, the various sensors 70 positioned within and/or on conduits of boiler module 72 may determine the temperature of the steam flowing through HRSG 54. That is, sensors 70 may determine and/or detect the temperature of the steam generated by steam generator module 76 flowing to steam drum 74, the temperature of the steam flowing from steam drum 74 to first superheater module 80, the temperature of the steam flowing from first superheater module 80 to second superheater module 82, the temperature of the steam flowing from second superheater module 82 to third superheater module 84, and the temperature of the steam flowing from third superheater module 84 to header 88. Additionally in the non-limiting example, sensors 70 positioned within header 88 and outlet manifold 90 may determine and/or detect the temperature of header 88 and outlet manifold 90. Additional sensors 70 of computing device(s) 66 may be configured to detect or determine a duration of operation of the steam generator module 76 based on, for example, steam generation within HRSG 54, the temperature of exhaust fluid 60 (e.g., gas) flowing over superheater modules 80, 82, 84 and/or a steam flow measurement of the steam flowing through HRSG 54. The temperatures (e.g., steam, component), steam flow measurement, and/or duration of operation detected by the various sensors 70 positioned within HRSG 54 may be provided to computing device(s) 66, and specifically control system 68. Using the sensor detected temperatures, steam flow measurement, and duration of operation, control system 68 may activate and/or adjust the operation or position of valve 106 to aid in the reduction of the thermal fatigue and/or stress experienced by components (e.g., header 88, outlet manifold 90) of HRSG 54 during operation of power plant system 12, as discussed herein.

It is understood that the number of sensors 70 shown in FIG. 2 as being positioned within HRSG 54 is merely illustrative. As such, computing device(s) 66 may include more or less sensors 70 positioned within HRSG 54 to aid in the reduction of the thermal fatigue and/or stress experienced by components of HRSG 54 (e.g., header 88, outlet manifold 90) during operation of power plant system 12, as discussed herein. Additionally, although a portion of the plurality of sensors 70 are not depicted to be in communication with computing device(s) 66, it is understood that all sensors 70 shown in FIG. 2 are in communication with and/or are capable of providing detected-data relating to operational characteristics of components of HRSG 54 to computing device(s) 66, as discussed herein. Furthermore, although computing device(s) 66, control system 68, and sensors 70 are only shown in FIG. 2, it is understood that computing device(s) 66, control system 68, and sensor(s) 70 may be included in any of the non-limiting examples discuss herein with respect to FIGS. 3-10.

During a start-up procedure of power plant system 12, and specifically when HRSG 54 initially begins to generate steam, header 88 and/or outlet manifold 90, which may be at reduced or pre-start temperature (e.g., room temperature), may be immediately exposed to heated, high-temperature steam. Header 88 and/or outlet conduit 90 may undergo a rapid temperature change and/or an increase in temperature as a result of being exposed to the heated, high-temperature steam. Bypass conduit 100 may aid in the reduction of the thermal fatigue and/or stress experienced by header 88 and/or outlet manifold 90 of HRSG 54 during operation of power plant system 12. For example, bypass conduit 100 may provide a portion of the steam from steam drum 74 flowing through conduit 92 to header 88 and/or outlet manifold 90 during operation of HRSG 54. The portion of steam provided from conduit 92 to header 88 and/or outlet manifold 90 of HRSG 54 may be steam that has been generated but not yet heated. That is, the steam provided to bypass conduit 100 from conduit 92 may be steam that has not yet been passed through any of the plurality of superheater modules 80, 82, 84 configured to heat the steam, as discussed herein. As such, the portion of steam provided to header 88 and/or outlet manifold 90 of HRSG 54 via bypass conduit may be cooler and/or have a lower temperature than the heated, high-temperature steam provided to header 88 and/or manifold 90 via third superheater module 84, as discussed herein. As such, the cooler steam provided to header 88 and/or outlet manifold 90 may reduce the temperature of header 88 and/or outlet maintain 90, and/or may mix with and reduce the temperature of the heated, high-temperature steam provided to header 88 and/or manifold 90 via third superheater module 84. This in turn may reduce the thermal fatigue and/or stress experienced by header 88 and/or outlet manifold 90 of HRSG 54 during operation of power plant system 12, because header 88 and/or outlet manifold 90 of HRSG 54 may not be initially and/or immediately exposed to the heated, high-temperature steam, and/or may be allowed to come up to a heightened operational temperature more gradually.

Additionally in a non-limiting example where bypass conduit 100 is in fluid communication with header 88 and/or outlet conduit 90, bypass conduit 100 may aid in the reduction of the thermal fatigue and/or stress experienced by header 88 and/or outlet manifold 90 of HRSG 54 during operation of power plant system 12 in a distinct manner. For example, where the portion of steam provided to header 88 and/or outlet conduit 90 from conduit 92 includes a temperature greater than the (internal) temperature of header 88 and/or outlet conduit 90, the steam may begin to gradually heat header 88 and/or outlet conduit 90. That is, prior to any steam being provided to header 88 and/or manifold 90 via third superheater module 84, bypass conduit 100 may provide a portion of the steam from conduit 92 to header 88 and/or outlet conduit 90. The steam provided by bypass conduit 100 may begin to gradually increase the temperature of header 88 and/or outlet conduit 90, which in turn may reduce the amount of temperature change experienced by header 88 and/or outlet conduit 90 once heated, high-temperature steam is provided to header 88 and/or outlet conduit 90 via third superheater module 84.

FIGS. 3-8 show schematic views of a portion of HRSG 54 including boiler module 72, steam drum 74, bypass conduit 100, and valve 106, as discussed herein. Although omitted from the non-limiting examples of FIGS. 3-8, it is understood that computing device(s) 66, control system 68, and sensor(s) 70 may be included in these non-limiting examples, and may be utilized to adjust the operation of valve 106, as discussed herein. It is understood that similarly numbered and/or named components may function in a substantially similar fashion. Redundant explanation of these components has been omitted for clarity.

Figure 3:
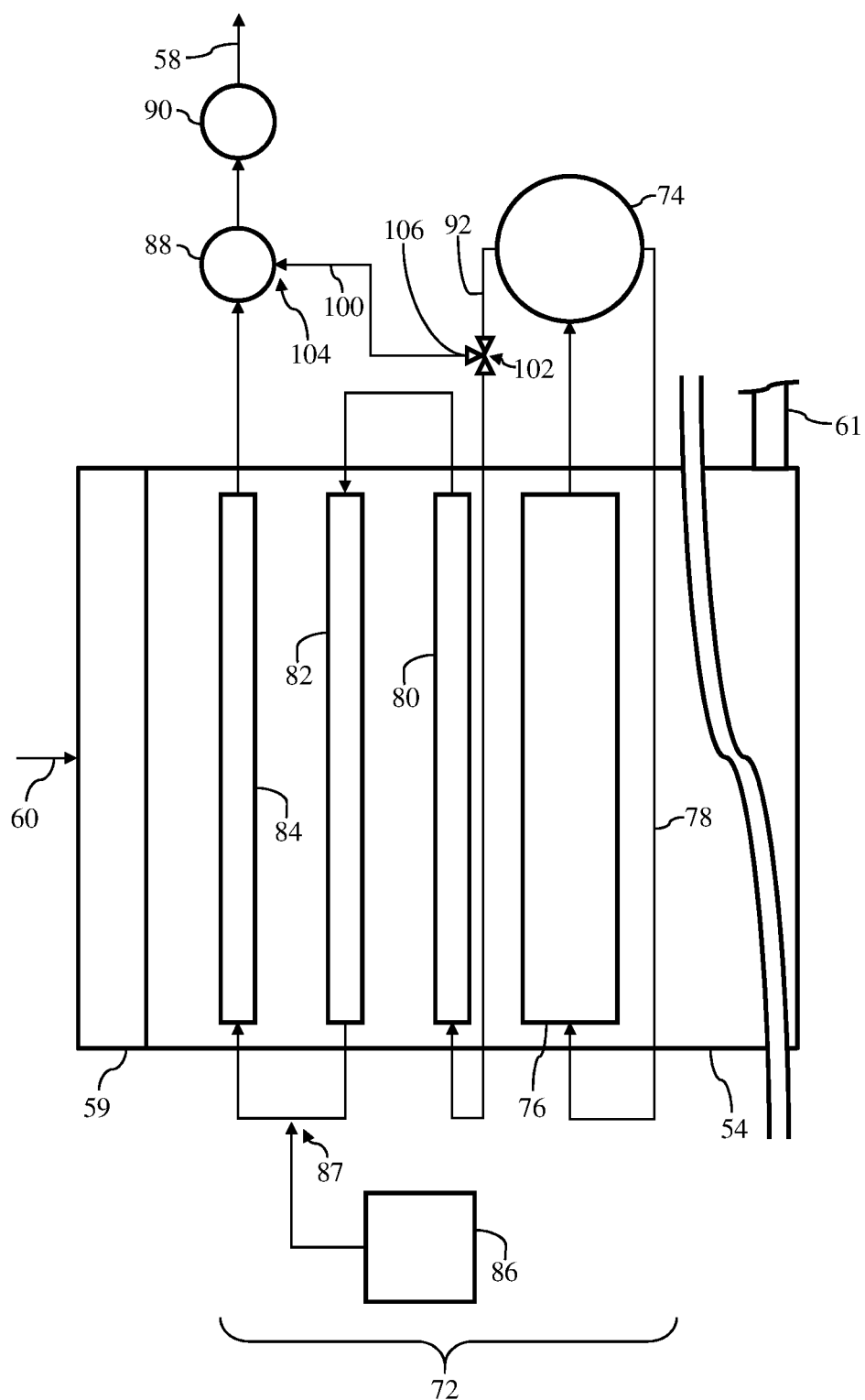
FIGS. 3-7 show schematic depiction of a portion of the HRSG of the combined cycle power plant system of FIG. 1 including bypass conduits, according to various additional embodiments of the disclosure.

As shown in the non-limiting example of FIG. 3, and similar to FIG. 2 discussed herein, bypass conduit 100 may include inlet 102 in fluid communication with the conduit 92 disposed between and fluidly coupling steam drum 74 to first superheater module 80, and outlet 104 in direct fluid communication with header 88 of HRSG 54. However, distinct from the non-limiting example shown and discussed herein with respect to FIG. 2, valve 106 may not be positioned directly on bypass conduit 100. Rather, and as shown in FIG. 3, valve 106 may be positioned at inlet 102 of bypass conduit 100. More specifically, valve 106 may be positioned on, and/or in direct fluid communication with both inlet 102 of bypass conduit 100, and conduit 92 disposed between and fluidly coupling steam drum 74 to first superheater module 80. As similarly discussed herein, valve 106 may be adjustable to provide a portion of steam from conduit 92 to header 88. Additionally as discussed herein with respect to FIG. 2, bypass conduit 100 of FIG. 3 may be, alternatively or additionally, in fluid communication with outlet manifold 90.

Figure 4:
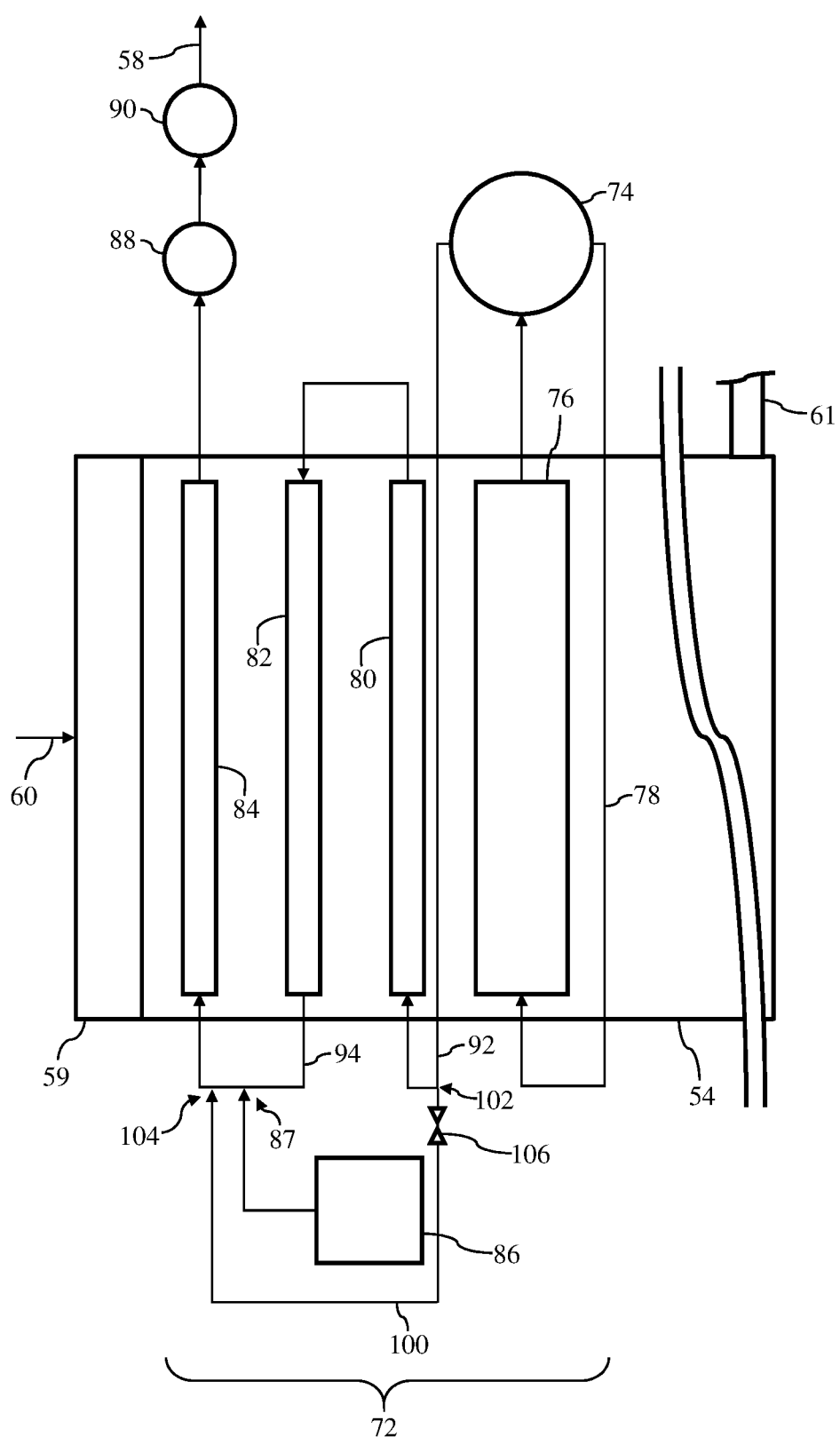
Figure 5:
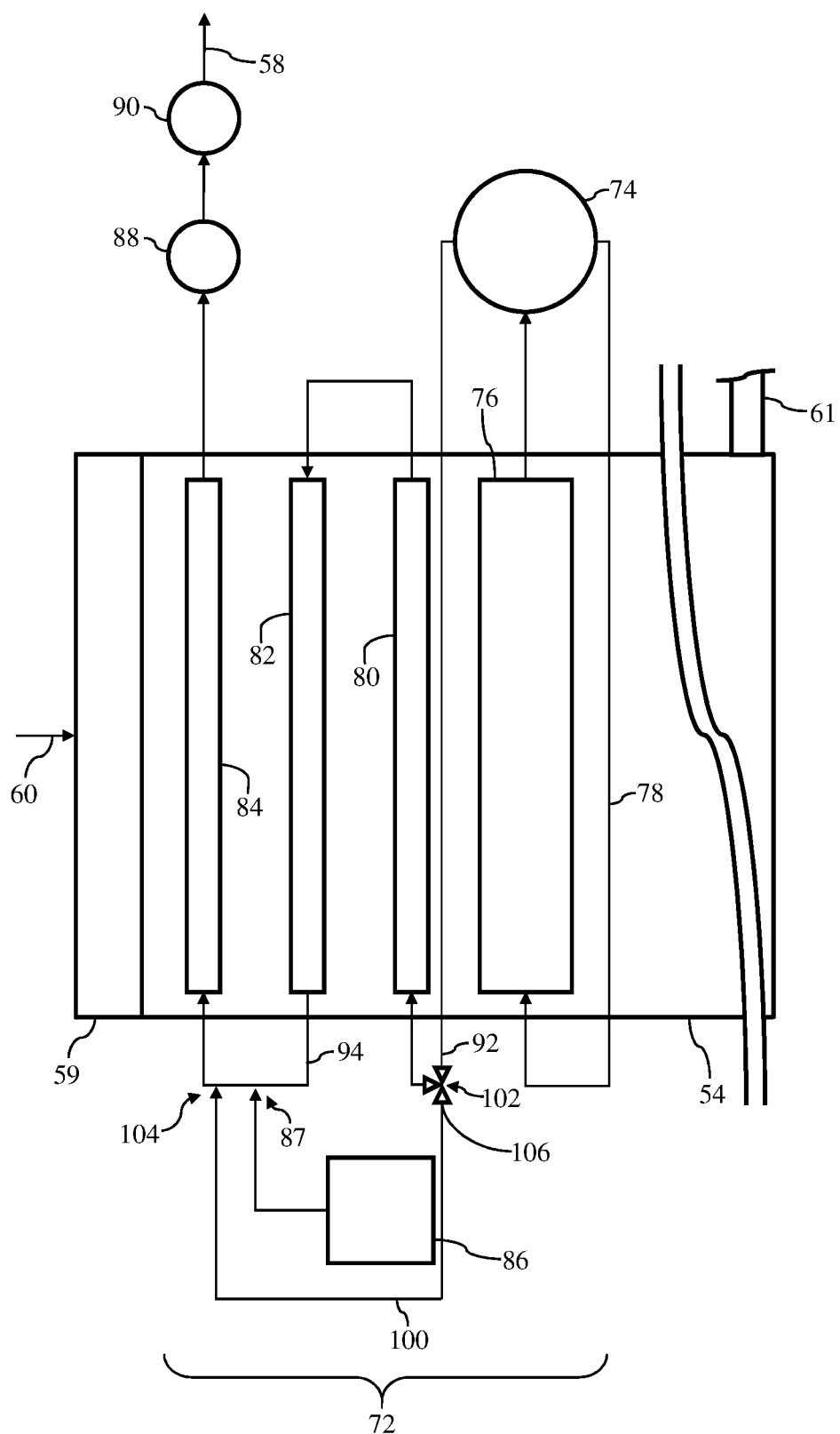

Turning to FIGS. 4 and 5, additional non-limiting examples are depicted. In the non-limiting examples, and similar to the examples discussed herein with respect to FIGS. 2 and 3, bypass conduit 100 may include inlet 102 in fluid communication with the conduit 92 disposed between and fluidly coupling steam drum 74 to first superheater module 80. However, in the non-limiting examples shown in FIGS. 4 and 5, outlet 104 of bypass conduit 100 may be positioned in distinct portions of boiler module 72 and/or HRSG 54. As shown in FIGS. 4 and 5, outlet 104 may positioned downstream of first superheater module 80, and more specifically, outlet 104 may be positioned between second superheater module 82 and third superheater module 84. In the non-limiting example, outlet 104 may be formed on, positioned within, and/or may be in fluid communication with the conduit 94 disposed between and fluidly coupling second superheater module 82 and third superheater module 84. Additionally as shown in FIGS. 4 and 5, outlet 104 of bypass conduit 100 may be formed on conduit 94, upstream of inlet 87 of desuperheater module 86. In other non-limiting examples, outlet 104 of bypass conduit 100 may be formed on conduit 94, downstream of inlet 87 of desuperheater module 86. As similarly discussed herein, valve 106 may be positioned directly on bypass conduit 100 (see, FIG. 4), or positioned on, and/or in direct fluid communication with both inlet 102, and conduit 94 (see, FIG. 5).

In these non-limiting examples shown in FIGS. 4 and 5, bypass conduit 100 may be in fluid communication with conduit 92 and conduit 94, respectively, and may provide a portion of steam flowing through conduit 92 to conduit 94 of boiler module 72 and/or HRSG 54 via outlet 104. The portion of steam provided to conduit 94 may then mix with the heated steam supplied to conduit 94 from second superheater module 82, before flowing to third superheater module 84. Because the steam provided by bypass conduit 100 includes a lower temperature than the remaining steam, the mix of steam entering third superheater module 84 may be lower than if third superheater module 84 was just provided steam from second superheater module 82 via conduit 94. As such, even after being heated by third superheater module 84, the steam leaving third superheater module 84 and flowing to header 88 and/or outlet manifold 90 may have a decreased temperature, which in turn, may reduce the thermal fatigue and/or stress experienced by header 88 and/or outlet manifold 90 of HRSG 54 during operation of power plant system 12, as discussed herein.

Figure 6:
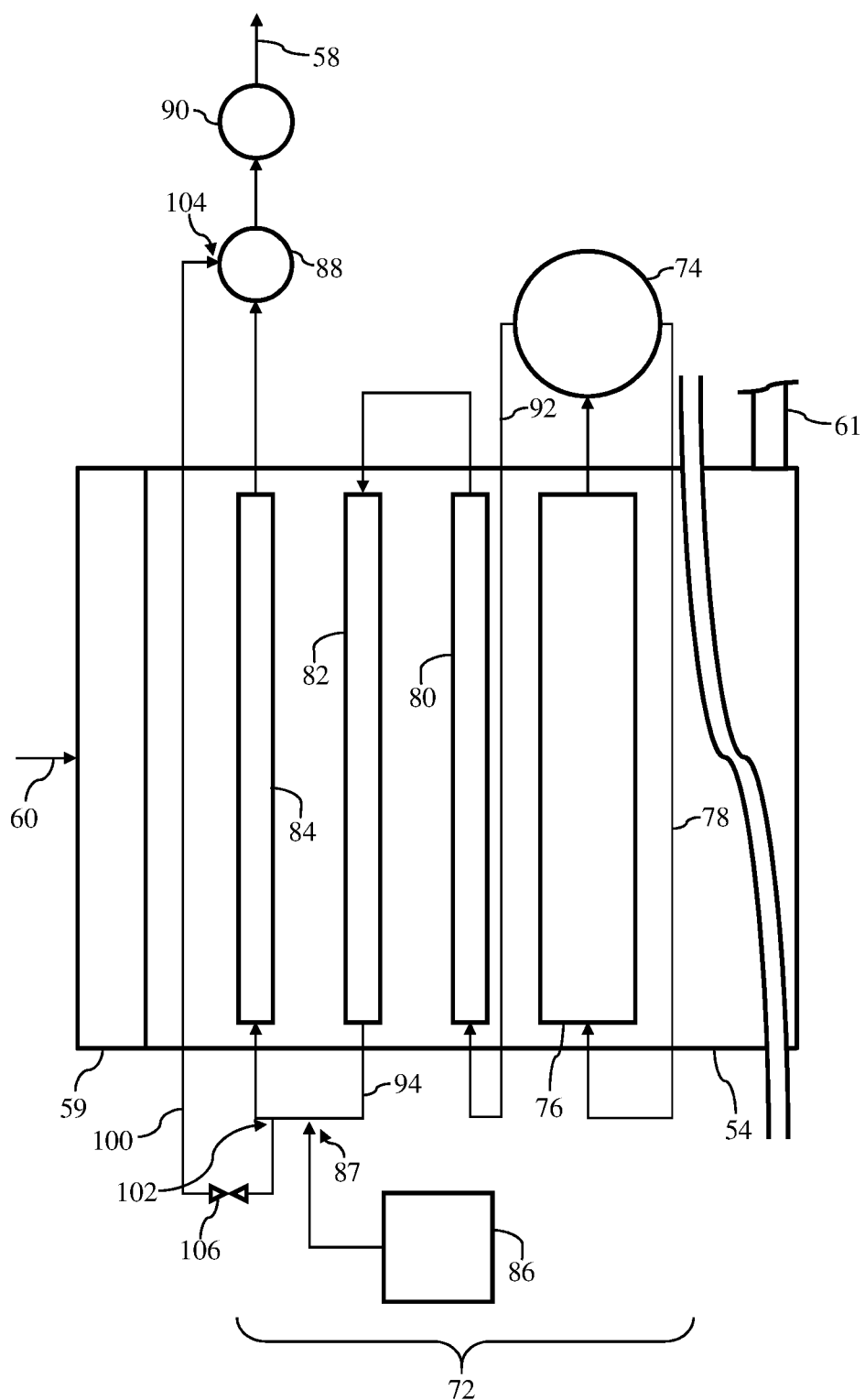
Figure 7:
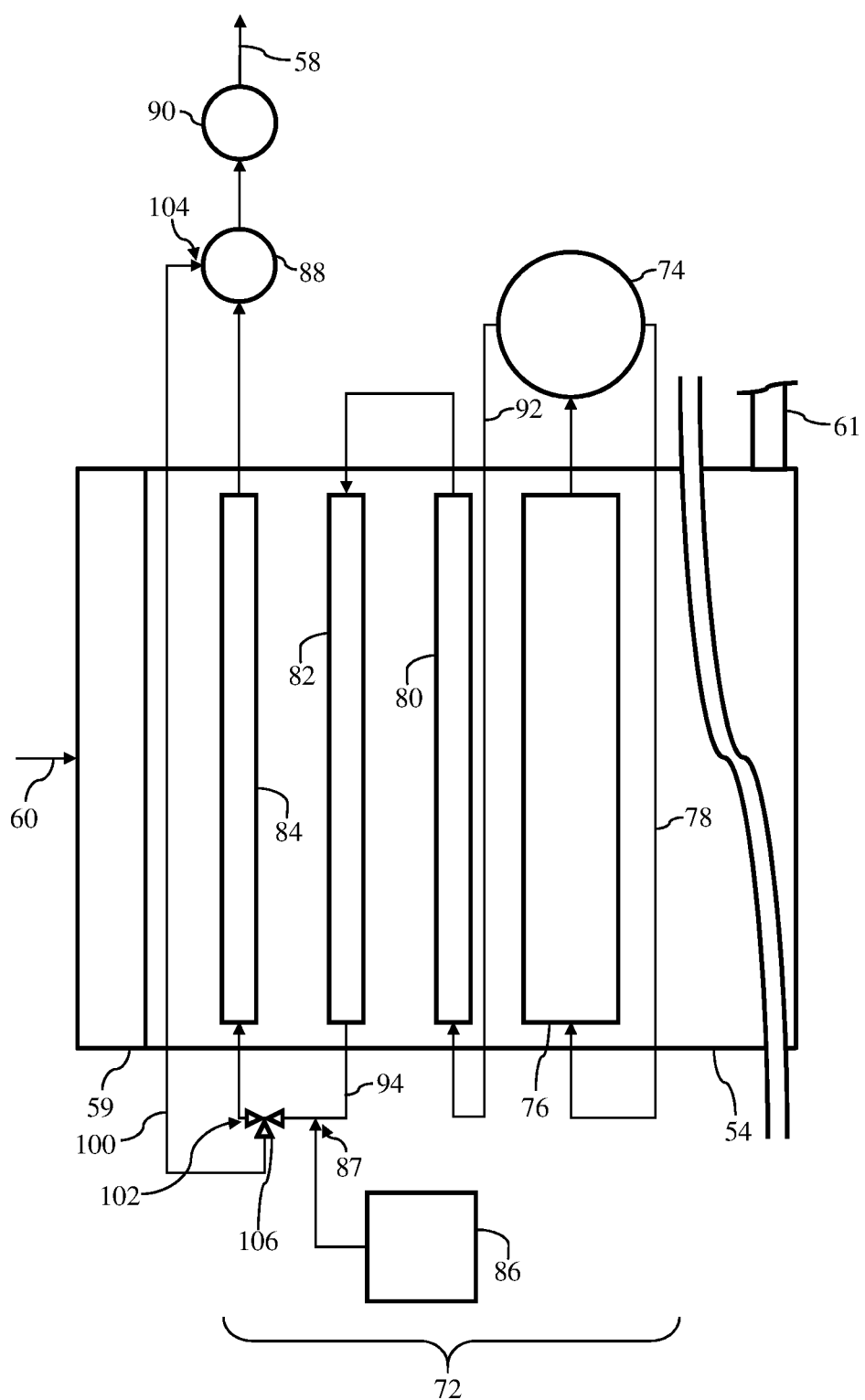

FIGS. 6-8 show additional non-limiting examples of HRSG 54. In the non-limiting examples, bypass conduit 100 may be positioned in distinct portions of boiler module 72 and/or HRSG 54. Specifically, and as shown in FIGS. 6-8, inlet 102 of bypass conduit 100 may be formed on, positioned within, and/or may be in fluid communication with the conduit 94 disposed between and fluidly coupling second superheater module 82 and third superheater module 84. Inlet 102 of bypass conduit 100 may be formed on conduit 94, upstream (see, FIGS. 6-8) or downstream (not shown) of inlet 87 of desuperheater module 86. Additionally in the non-limiting examples shown in FIGS. 6-8, outlet 104 of bypass conduit 100 may be formed in, positioned on, and/or in direct fluid communication with header 88 (and/or outlet manifold 90) of HRSG 54. Furthermore in the non-limiting examples, valve 106 may be positioned directly on bypass conduit 100 (see, FIGS. 6 and 8), or positioned on, and/or in direct fluid communication with both inlet 102, and conduit 94 (see, FIG. 7).

Additionally as shown in FIG. 8, HRSG 54 may also include a distinct bypass conduit 108. Distinct bypass conduit 108 may be distinct and/or unique from bypass conduit 100. Distinct bypass conduit 108 may include an inlet 110 positioned downstream of first superheater module 80. Additionally, and as shown in the non-limiting example of FIG. 8, inlet 110 of distinct bypass conduit 108 be formed on, positioned within, and/or may be in fluid communication with bypass conduit 100. In another non-limiting example, inlet 110 of distinct bypass conduit 108 may be positioned between second superheater module 82 and third superheater module 84. More specifically, inlet 110 may be formed on, positioned within, and/or may be in fluid communication with the conduit 94 disposed between and fluidly coupling second superheater module 82 and third superheater module 84, adjacent inlet 102 of bypass conduit 100. Additionally as shown in FIG. 8, outlet 112 of distinct bypass conduit 108 may be formed on, positioned within, and/or may be in direct fluid communication with steam supply conduit 58 positioned downstream of and in fluid communication with outlet manifold 90. Similar to bypass conduit 100 shown in FIG. 8, distinct bypass conduit 108 may also include valve 118 positioned and/or formed directly on distinct bypass conduit 108, between inlet 110 and outlet 112, respectively. Distinct bypass conduit 108 may be utilized within HRSG 54 to manage and/or adjust the total flow of steam through third superheater module 84. For example, distinct bypass conduit 108 may allow additional steam flowing through conduit 94 to bypass third superheater module 84, which in turn may result in less steam flowing through and being heated by third superheater module 84 before being provided and/or supplied to header 88.

FIGS. 9 and 10 show schematic views of a portion of non-limiting examples of HRSG 54 and bypass conduit 100. Similar to FIGS. 3-8, and although omitted from the non-limiting examples of FIGS. 9 and 10, it is understood that computing device(s) 66, control system 68, and sensor(s) 70 may be included in these non-limiting examples, and may be utilized to adjust the operation of valve 106, as discussed herein. It is understood that similarly numbered and/or named components may function in a substantially similar fashion. Redundant explanation of these components has been omitted for clarity.

Distinct from the non-limiting examples discussed herein with respect to FIGS. 2-8, HRSG 54 shown in FIGS. 9 and 10 may include some distinct components. For example, HRSG 54 may not include steam drum 74. Rather, HRSG 54 shown in the non-limiting examples of FIGS. 9 and 10 may be configured and/or formed as a once through heat recovery steam generator, commonly referred to as a once through steam generator ("OTSG"). As such, steam generator module 76 may receive feed water from feed water conduit 78, which may be in fluid communication with a feed water source (e.g., water supply or storage) (not shown). The feed water may be continuously provided to steam generator module 76 from feed water conduit 78, and be converted to steam, as similarly discussed herein. The steam may then move to a separator 96 of HRSG 54 positioned between and in fluid communication with steam generator module 76 and first superheater module 80. Separator 96 may separate and/or remove saturated steam from the steam generated by steam generator module 76 before providing the steam (e.g., working fluid) to first superheater module 80 via conduit 92.

Similar to the non-limiting examples discussed herein with respect to FIGS. 2-8, the non-limiting examples of HRSG 54 shown in FIGS. 9 and 10 may also include bypass conduit 100. As similarly discussed herein, bypass conduit 100 may receive a portion of the steam generated by steam generator module 76 and may provide it to a component (e.g., header 88, outlet manifold 90) of boiler module 72 and/or HRSG 54 downstream of steam generator module 76 to aid in reducing the thermal fatigue and/or stress experienced by the component. As shown in FIG. 9, and similar to the non-limiting example of FIG. 3, bypass conduit 100 may include inlet 102 in fluid communication with the conduit 92 disposed between and fluidly coupling separator 96 to first superheater module 80, outlet 104 in direct fluid communication with header 88 of HRSG 54, and valve 106 positioned at inlet 102 of bypass conduit 100. In this non-limiting example, bypass conduit 100 may receive a portion of steam from separator 96 and provide the steam to header 88. Additionally in the non-limiting example shown in FIG. 10, and similar to the non-limiting example of FIG. 6, bypass conduit 100 may include inlet 102 may be in fluid communication with the conduit 94 disposed between and fluidly coupling second superheater module 82 and third superheater module 84, and outlet 104 in direct fluid communication with header 88 of HRSG 54. Furthermore in the non-limiting example of FIG. 10, and similar to FIG. 6, valve 106 may be positioned directly on bypass conduit 100. In this non-limiting example, and as similarly discussed herein, bypass conduit 100 may receive a portion of steam from second superheater module 82, via conduit 94, and provide the steam to header 88.

Two non-limiting examples for bypass conduit 100 positioned within HRSG 54 including separator 96 (e.g., OTSG) are shown in FIGS. 9 and 10. However, it is understood that HRSG 54 including separator 96, in place of steam drum 74 (e.g., FIGS. 2-8), may include bypass conduit 100 (and distinct bypass conduit 108) positioned in and/or in fluid communication with the various components of HRSG 54 discussed herein with respect to FIGS. 2-8. That is, although two examples are shown herein with respect to FIGS. 9 and 10, HRSG 54 including separator 96 may include bypass conduit 100 in fluid communication with any and/or all of the components discussed in the various non-limiting examples of FIGS. 2-8.

The various, non-limiting examples shown in FIGS. 3-10 may include bypass conduit 100 in HRSG 54 to aid in the reduction of the thermal fatigue and/or stress experienced by header 88 and/or outlet manifold 90 of HRSG 54 during operation of power plant system 12. That is, each of the distinct configurations of bypass conduit 100 discussed herein with respect to FIGS. 3-10 may also aid in the reduction of the thermal fatigue and/or stress experienced by header 88 and/or outlet manifold 90 of HRSG 54 during a start-up procedure of power plant system 12. For example, when a portion of steam flows through bypass conduit 100 in any of the non-limiting examples discussed herein with respect to FIGS. 3-10, header 88 and/or outlet manifold 90 may be provided with steam having a reduced temperature. As a result of the steam having a reduced temperature, header 88 and/or outlet manifold 90 may not experience a rapid temperature change, and ultimately may not experience as much thermal fatigue and/or stress than if header 88 and/or outlet manifold 90 were provide heated, high-temperature steam during the start-up procedure.

FIG. 11 shows a perspective view of a portion of header 88 of HRSG 54. Specifically, FIG. 11 shows a perspective view of a plurality of header conduits 98A, 98B, 98C forming header 88, a plurality of distribution links 120 in communication with the plurality of header conduits 98A, 98B, 98C, and a plurality of outlet links 99 in communication with the plurality of header conduits 98A, 98B, 98C. It is understood that similarly numbered and/or named components may function in a substantially similar fashion. Redundant explanation of these components has been omitted for clarity.

As discussed herein with respect to FIG. 2, and as shown in FIG. 11, header 88 may be formed from a plurality of header conduits 98A, 98B, 98C. Each of the plurality of header conduits 98A, 98B, 98C may in fluid communication with third superheater module 84 (see, FIG. 2) and may receive heated, high-temperature steam from third superheater module 84, as discussed herein. Additionally, each of the plurality of header conduits 98A, 98B, 98C forming header 88 may be in fluid communication with outlet manifold 90 (see, FIG. 2) via the plurality of outlet links 99. That is, each of the plurality of outlet links 99 may be in fluid communication with and/or may fluidly couple each of the plurality of header conduits 98A, 98B, 98C to outlet manifold 90 of HRGS 54 (see, FIG. 2). The plurality of outlet links 99 may provide the heated, high-temperature steam, received by each header 98A, 98B, 98C from third superheater module 84, to outlet manifold 90, as discussed herein. In some non-limiting examples discussed herein, bypass conduit 100 may also be in direct fluid communication with at least one of the plurality of header conduits 98A, 98B, 98C forming header 88 (see, FIGS. 2, 3, and 6-8). The number of header conduits shown in FIG. 11 are merely illustrative. As such, it is understood that header 88 may include more or less header conduits 98A, 98B, 98C, than those shown in FIG. 11.

To aid in the distribution of steam within header 88 to reduce thermal fatigue and/or stress experienced therein, header 88 may include a plurality of distribution links 120. The plurality of distribution links 120 may be in fluid communication with the plurality of header conduits 98A, 98B, 98C forming header 88. That is, and as shown in the non-limiting example of FIG. 11, each of the plurality of distribution links 120 may be in fluid communication with two distinct header conduits of the plurality of header conduits 98A, 98B, 98C. Distribution links 120 may provide a flow path for the steam provided to header 88 to flow between the plurality of header conduits 98A, 98B, 98C. This additional flow path for the steam provided the distribution links 120 of header 88 may reduce thermal fatigue and/or stress experienced by header 88 by providing additional flow regions for the heated, high-temperature steam provided to header 88. That is, the plurality of distribution links 120 of header 88 may provide additional surface area within header 88 that may come in contact with and be exposed to heated, high-temperature steam provided by third superheater module 84.

Additionally, or alternatively, the plurality of distribution links 120 of header 88 may aid in the reduction of thermal fatigue and/or stress experienced by header 88 by providing additional flow paths for distributing the portion of steam supplied by bypass conduit 100 to the plurality of header conduits 98A, 98B, 98C forming header 88. That is, where bypass conduit 100 may only be in direct fluid communication with one of the plurality of header conduits 98A, 98B, 98C, distribution links 120 may provide flow paths to allow the portion of steam provided by bypass conduit 100 to flow to each of the plurality of header conduits 98A, 98B, 98C. Alternatively where bypass conduit 100 is in direct fluid communication with each of the plurality of header conduits 98A, 98B, 98C, distribution links 120 may provide additional flow paths that may ensure the portion of steam provided by bypass conduit 100 may freely flow through each of the plurality of header conduits 98A, 98B, 98C at locations distinct from outlet 104 of bypass conduit 100.

In another non-limiting example shown in FIG. 12, bypass conduit 100 may be in direct fluid communication with the plurality of distribution links 120 of header 88. More specifically, and as shown in FIG. 12, bypass conduit 100 may include a plurality of manifold conduits 122 including outlet 104 of bypass conduit 100 directly coupled to and/or in direct fluid communication with a corresponding distribution link 120 of header 88. In this non-limiting example bypass conduit 100 may be in fluid communication with and/or may utilize distribution links 120 of header 88 to ensure the portion of steam provided by bypass conduit 100 may freely flow through each of the plurality of header conduits 98A, 98B (not shown), 98C (not shown). Utilizing using distribution links 120 to provide the portion of steam from bypass conduit 100 to header conduits 98A, 98B, 98C may result in a reduction of thermal fatigue and/or stress experienced by header 88, as similarly discussed herein.

FIG. 13 shows another non-limiting example of bypass conduit 100 in fluid communication with a distinct conduit of HRSG 54 (see, FIG. 2), as discussed herein. For example, and as similarly discussed herein with respect to FIG. 2, bypass conduit 100 may be in fluid communication with and/or fluidly coupled to outlet manifold 90 of HRSG 54 (see, FIG. 2). In this non-limiting example shown in FIG. 13, and as similarly discussed herein with respect to FIG. 12, bypass conduit 100 may include a plurality of manifold conduits 122 including outlet 104 of bypass conduit 100 directly coupled to and/or in direct fluid communication with outlet manifold 90 for providing the portion of steam flowing through bypass conduit 100 to outlet manifold 90. In another non-limiting example shown in FIG. 13, and as similarly discussed herein with respect to FIG. 4, the plurality of manifold conduits 122 of bypass conduit 100 may include outlets 104 directly coupled to and/or in direct fluid communication with conduit 94 for providing the portion of steam flowing through bypass conduit 100 to conduit 94 fluidly coupling second superheater module 82 and third superheater module 84.

Technical effect is to provide bypass conduits within a heat recovery steam generator (HRSG) of a combined cycle power plant system that are capable of reducing fatigue and stress experienced by headers and/or outlet manifolds within the HRSG.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A heat recovery steam generator (HRSG) for a combined cycle power plant system, the HRSG comprising:
   a steam generator module generating steam;
   a first superheater module positioned downstream of the steam generator module, the first superheater module receiving the steam generated by the steam generator module;
   a second superheater module positioned downstream from the first superheater module;
   a header positioned downstream of and in fluid communication with the second superheater module;
   a bypass conduit for receiving a portion of the steam generated by the steam generator module, the bypass conduit including:
      an inlet positioned downstream of the steam generator module, and
      an outlet positioned downstream of the first superheater module, the outlet in direct fluid communication with the header; and
   a valve in fluid communication with the bypass conduit, the valve providing steam to the outlet of the bypass conduit.

2. The HRSG of claim 1, wherein the inlet is positioned between the steam generator module and the first superheater module.

3. The HRSG of claim 2, wherein the valve is positioned at one of:
   the inlet of the bypass conduit, between the steam generator module and the first superheater module, or
   directly on the bypass conduit, between the inlet and the outlet.

4. The HRSG of claim 2, further comprising:
   an outlet manifold positioned downstream of and in fluid communication with the header.

5. The HRSG of claim 2, wherein the outlet of the bypass conduit is positioned between the first superheater module and the second superheater module.

6. The HRSG of claim 5, further comprising:
   a desuperheater module including an inlet positioned between the first superheater module and the second superheater module, the inlet of the desuperheater module positioned upstream of the outlet of the bypass conduit.

7. The HRSG of claim 1, wherein the valve provides steam to the outlet of the bypass conduit based on an operational characteristic, the operational characteristic including at least one of:
   a temperature of a header positioned downstream of and in fluid communication with the second superheater module;
   a temperature of an outlet manifold positioned downstream of and in fluid communication with the header;

a temperature of the steam generated by the steam generator module;
a temperature of the steam after flowing through the first superheater module;
a temperature of the steam after flowing through the second superheater module;
a duration of operation of the steam generator module;
a temperature of an exhaust gas flowing over the first superheater module and the second superheater module; or
a steam flow measurement of the steam.

8. The HRSG of claim 7, further comprising:
a controller operatively coupled to the valve to adjust the position of the valve between an open position and a closed position to provide steam to the outlet of the bypass conduit based on the operational characteristic and
at least one sensor operatively coupled to the controller to detect the operational characteristic.

9. A combined cycle power plant system comprising:
a gas turbine system including a turbine component discharging an exhaust gas; and
a heat recovery steam generator (HRSG) in fluid communication with the turbine component for receiving the exhaust gas, the HRSG including:
a steam generator module generating steam;
a first superheater module positioned downstream of the steam generator module, the first superheater module receiving the steam generated by the steam generator module;
a second superheater module positioned downstream from the first superheater module;
a header positioned downstream of and in fluid communication with the second superheater module;
a bypass conduit for receiving a portion of the steam generated by the steam generator module, the bypass conduit including:
an inlet positioned downstream of the steam generator module; and
an outlet positioned downstream of the first superheater module, the outlet in direct fluid communication with the header; and
a valve in fluid communication with the bypass conduit, the valve providing steam to the outlet of the bypass conduit.

10. The combined cycle power plant system of claim 9, wherein the inlet of the bypass conduit of the HRSG is positioned between the steam generator module and the first superheater module of the HRSG.

11. The combined cycle power plant system of claim 10, wherein the HRSG further comprises:
an outlet manifold positioned downstream of and in fluid communication with the header.

12. The combined cycle power plant system of claim 10, wherein the outlet of the bypass conduit of the HRSG is positioned between the first superheater module and the second superheater module of the HRSG.

13. The combined cycle power plant system of claim 12, wherein the HRSG further comprises:
a desuperheater module including an inlet positioned between the first superheater module and the second superheater module, the inlet of the desuperheater module positioned upstream of the outlet of the bypass conduit.

14. A heat recovery steam generator (HRSG) for a combined cycle power plant system, the HRSG comprising:
a steam generator module generating steam;
a first superheater module positioned downstream of the steam generator module, the first superheater module receiving the steam generated by the steam generator module;
a second superheater module positioned downstream from the first superheater module;
a header positioned downstream of and in fluid communication with the second superheater module;
a bypass conduit for receiving a portion of the steam generated by the steam generator module, the bypass conduit including:
an inlet positioned downstream of the steam generator module, between the first superheater module and the second superheater module, and
an outlet positioned downstream of the first superheater module, the outlet in direct fluid communication with the header; and
a valve in fluid communication with the bypass conduit, the valve providing steam to the outlet of the bypass conduit.

15. The HRSG of claim 14, wherein the valve is positioned at one of:
the inlet of the bypass conduit, between the first superheater module and the second super heater module, or
directly on the bypass conduit, between the inlet and the outlet.

16. The HRSG of claim 14, further comprising:
an outlet manifold positioned downstream of and in fluid communication with the header;
a steam supply conduit in fluid communication with and positioned downstream of the outlet manifold; and
a distinct bypass conduit including:
a distinct bypass inlet positioned downstream of the first superheater module; and
a distinct bypass outlet in direct fluid communication with the steam supply conduit, downstream of the outlet manifold.

* * * * *